Patented Feb. 11, 1930

1,747,107

UNITED STATES PATENT OFFICE

GEORGES DE NIEDERHÄUSERN, OF BASEL, SWITZERLAND, ASSIGNOR TO THE FIRM DURAND & HUGUENIN S. A., OF BASEL, SWITZERLAND

PRODUCTION OF FAST DYEINGS AND PRINTINGS WITH VAT DYESTUFFS

No Drawing. Application filed November 17, 1927, Serial No. 234,040, and in Germany November 29, 1926.

In the United States patent specification No. 1,448,251 there is described a process for the manufacture of water-soluble ester like derivatives of leuco vat dyestuffs, so called ester salts. In a further United States patent specification No. 1,575,958 the application of such ester salts for dyeing and printing textile fibres is disclosed. This dyeing and printing process essentially consists in applying to the goods an ester salt and in then developing in the dyeing or printing thereon by reforming the dyestuff through the action of a suitable oxidizing agent.

This general process has been modified in various directions. According to the process described in the British patent specification No. 220,964 an ester salt of a leuco vat dyestuff is applied on a fibre from a neutral or weakly acid solution, simultaneously with a suitable oxidizing agent, eventually with a catalyst promoting oxidation, and the action of the oxidation necessary for the development of the dyeing, is engaged by steaming. In practice, one uses in this process ammonium salts which dissociate through steaming and thus furnish the required quantity of acid. As the ester salts of leuco vat dyestuffs on the market contain a varying percentage of alkali which has to be neutralized before oxidation is possible at all, these ammonium salts which are ineffective in the cold and only act on steaming, represent, if used in sufficiently large quantities, a good agent for an easy and sure performance of the process.

An exact dosage of these ammonium salts is not necessary; particularly suitable salts for the present purpose are sulphocyanide of ammonia, lactate of ammonia and sulphate of ammonia.

However, there are cases where the used ester salt of a leuco vat dyestuff forms by way of double decomposition a difficultly soluble ammonium salt. This as a drawback which is very troublesome in the case of the above said steam-developing process, and which in may cases renders the process practically unsuitable.

It has now been found that this drawback in said steam-developing process can be avoided if in place of the ammonium salts mentioned above, one uses certain other bodies capable of yielding acid in the hot state, of such a kind, however, as to be free from any tendency of causing precipitations in the printing pastes or padding solutions. Such bodies are for instance: mono-chlorhydrin, di-chlor-hydrin, chlorethyl alcohol, methyl- or ethyl sulphate of potassium, diethyl tartrate, glycerine phosphoric acid ester, and others.

The kind and quantity of the compounds to be used depend upon the quantity of acid which is necessary for initiating or releasing the oxidation.

The present improvement of the process is illustrated by the following examples, the parts being by weight.

I. Padding bath

| | Parts |
|---|---|
| Ester salt of leuco-dibenzpyrenquinone | 6 |
| Glycerine | 10 |
| Water | 154 |
| Tragacanth | 10 |
| A solution of sodium chlorate (10%) | 4 |
| Mono-chlor-hydrin | 6 |
| A solution of ammonium vanadate (1%) | 10 |
| | 200 |

Cotton is padded in this solution, dried and steamed for 10 minutes, then washed, soaped under boiling, and again washed. Thus fast dyeings are obtained.

II. Printing

| | Parts |
|---|---|
| Ester salt of leuco-5:5'-dichloro-7:7'-dimethylthioindigo (40%) | 5 |
| Diethyl tartrate | 8 |
| Thickening | 45 |
| A solution of sodium chlorate (1:3) | 2 |
| A solution of ammonium vanadate (1%) | 2 |
| A solution of borax (1%) | 10 |
| Water | 28 |
| | 100 |

Cotton is printed with such paste, dried and steamed for 10 minutes, then washed, soaped under boiling, and again washed. Thus fast prints are obtained.

The improved process is applicable not only to cotton, but also to other fibres, such as viscose, natural silk, etc.

In this process ester salts of all classes of vat dyestuffs, such as those of the indigo, thioindigo, anthraquinone, quinone anilid series, etc., can be employed.

What I claim is:

1. A process for dyeing and printing with vat dyestuffs by reforming the vat dyestuff from a water soluble ester salt of a leuco vat dyestuff by means of acid oxidation on a fibre, which consists in applying to the latter an ester salt of a leuco vat dyestuff, an oxidizing agent effective in acid medium, further an acid yielding substance capable of producing only in hot state the acid medium, being free from any tendency of causing precipitations in printing pastes or padding solutions, and in steaming the thus prepared fibre to effect the development of the dyeing.

2. A process for dyeing and printing with vat dyestuffs by reforming the vat dyestuff from a water soluble ester salt of a leuco vat dyestuff by means of acid oxidation on a fibre, which consists in applying to the latter an ester salt of a leuco vat dyestuff, an oxidizing agent effective in acid medium, further diethyl tartrate as an acid yielding substance capable of producing only in hot state the acid medium, being free from any tendency of causing precipitations in printing pastes or padding solutions, and in steaming the thus prepared fibre to effect the development of the dyeing.

3. A process for dyeing and printing with vat dyestuffs by reforming the vat dyestuff from a water soluble ester salt of a leuco vat dyestuff by means of acid oxidation on a fibre, which consists in applying to the latter the ester salt of leuco 5:5'-dichloro-7:7'-dimethylthioindigo, an oxidizing agent effective in acid medium, further an acid yielding substance capable of producing only in hot state the acid medium, being free from any tendency of causing precipitations in printing pastes or padding solutions, and in steaming the thus prepared fibre to effect the development of the dyeing.

4. A process for dyeing and printing with vat-dyestuffs by reforming the vat dyestuff from a water soluble ester salt of a leuco vat dyestuff by means of acid oxidation on a fibre, which consists in applying to the latter the ester salt of leuco 5:5'-dichloro-7:7'-dimethylthioindigo, an oxidizing agent effective in acid medium, further diethyl tartrate as acid yielding substance capable of producing only in hot state the acid medium, being free from any tendency of causing precipitations in printing pastes or padding solutions, and in steaming the thus prepared fibre to effect the development of the dyeing.

In witness whereof I have hereunto signed my name this 7th day of November, 1927.

GEORGES DE NIEDERHÄUSERN.